(12) United States Patent
Bayer et al.

(10) Patent No.: US 11,015,051 B2
(45) Date of Patent: May 25, 2021

(54) POLYETHYLENE TEREPHTHALATE CONTAINERS WITH IMPROVED PERFORMANCE

(71) Applicant: Indorama Germany GmbH, Hattersheim (DE)

(72) Inventors: Uwe Bayer, Gessertshausen (DE); Gerald Engelmann, Thierhaupten (DE); Karsten Fritsch, Schwabmuenchen (DE)

(73) Assignee: Indorama Germany GMBH, Hattersheim (DE)

( * ) Notice: Subject to any disclaimer, the term of this patent is extended or adjusted under 35 U.S.C. 154(b) by 0 days.

(21) Appl. No.: 16/487,668

(22) PCT Filed: Feb. 15, 2018

(86) PCT No.: PCT/US2018/018342
§ 371 (c)(1),
(2) Date: Aug. 21, 2019

(87) PCT Pub. No.: WO2018/156414
PCT Pub. Date: Aug. 30, 2018

(65) Prior Publication Data
US 2020/0002528 A1 Jan. 2, 2020

Related U.S. Application Data

(60) Provisional application No. 62/463,293, filed on Feb. 24, 2017.

(51) Int. Cl.
*C08L 67/02* (2006.01)
*C08G 63/688* (2006.01)

(52) U.S. Cl.
CPC .......... *C08L 67/02* (2013.01); *C08G 63/6886* (2013.01); *C08L 2203/10* (2013.01); *C08L 2205/025* (2013.01); *C08L 2205/03* (2013.01)

(58) Field of Classification Search
CPC ...................................................... C08L 67/02
See application file for complete search history.

(56) References Cited

U.S. PATENT DOCUMENTS

| | | | |
|---|---|---|---|
| 6,777,479 B1 * | 8/2004 | Bernard | C08J 5/005 524/445 |
| 7,919,159 B2 * | 4/2011 | Liu | C08L 67/02 428/34.1 |
| 2014/0107300 A1 | 4/2014 | Callander et al. | |

FOREIGN PATENT DOCUMENTS

| | | |
|---|---|---|
| WO | 2005023530 A1 | 3/2005 |
| WO | 2006023583 A2 | 3/2006 |

OTHER PUBLICATIONS

International Search Report for International Application No. PCT/US2018/018342 dated Apr. 23, 2018.

\* cited by examiner

*Primary Examiner* — Vickey Nerangis
(74) *Attorney, Agent, or Firm* — Nexsen Pruet, PLLC; Seth Hudson

(57) ABSTRACT

Compositions of compatibilized blends of polyamides in polyesters, methods and resins for forming such compositions, and containers made from such compositions which higher burst pressure, crystallization at higher temperatures during production and reduced haze as compared to than containers made from previous blends are disclosed.

9 Claims, No Drawings

POLYETHYLENE TEREPHTHALATE CONTAINERS WITH IMPROVED PERFORMANCE

FIELD OF THE INVENTION

The invention relates to compositions, compatibilized blends of polyamides in polyesters, a method for forming such compositions, and to containers and multilayer structures made from such compositions. Specifically, containers produced from these compositions exhibit higher burst pressure than containers made from previous blends. Further, the compositions exhibit modified crystallization during production, thus increasing the window for container production. In addition, containers produced from these compositions exhibit improved haze. The blends can be used as passive gas barriers, or active oxygen scavengers with the addition of a transition metal catalyst.

BACKGROUND

Plastic materials have been replacing glass and metal packaging materials due to their lighter weight, decreased breakage compared to glass, and potentially lower cost.

Large polyethylene terephthalate (PET) containers for beverages with high C02 content require a high burst pressure resistance during filling. Breweries require a safety margin in burst pressure of two to four bar above the C02 pressure in the beverage. For beer filling application, the working pressure is about 4 bar. Accordingly, with the required safety margin of 2-4 bar, these PET containers should be able to withstand pressures of up to 8 bars. Further, in some cases, to increase shelf-life for C02-containing materials in large PET containers, the C02 pressure in the beverage is increased. Accordingly, a higher C02 pressure in the beverage will require an even higher final burst pressure for the keg.

U.S. Pat. Nos. 7,943,216 and 7,919,159 disclose a blend of polyester and partially aromatic polyamide with an ionic compatibilizer and a cobalt salt with improved color and clarity. A composition of PolyShield® 2300K resin and 5 wt. % MXD6 (Mitsubishi 6007 grade) as described in these patents is currently used for the manufacture of large containers. A 20 liter container using this combination has a burst pressure of about 8 bar.

SUMMARY OF THE INVENTION

The present invention is an improvement over polyester/polyamide blends known in the art in that the compositions of the present invention produce containers with higher burst pressure than containers made from previous blends, modified crystallization and/or improved haze.

Accordingly, an aspect of the present invention relates to compositions comprising a blend of polyester and a partially aromatic polyamide with an ionic compatibilizer and optionally a cobalt salt.

In one nonlimiting embodiment, the polyester is a polyethylene terephthalate modified to include one or more ionic compatibilizers.

In one nonlimiting embodiment, the partially aromatic polyamide is meta-xylylene adipamide.

Another aspect of the present invention relates to a modified PET comprising PET, 2.5-4.5 wt. % IPA and 0.4 to 0.7 wt. % NaSIM.

In one nonlimiting embodiment, the PET is modified with 2.95 wt. % IPA and 0.45 wt. % NaSIM.

Another aspect of the present invention relates to a container having both active and passive oxygen barrier and carbon dioxide barrier properties with improved burst pressure as compared to containers known in the art.

Another aspect of the present invention relates to containers having both active and passive oxygen barrier and carbon dioxide barrier properties with improved haze as compared to containers known in the art.

Another aspect of the present invention relates to a method to blend polyester and polyamides with an ionic compatibilizer and a cobalt salt to produce a container having both active and passive oxygen barrier and carbon dioxide barrier properties with improved burst pressure as compared to containers known in the art.

Yet another aspect of the present invention relates to a method to blend polyester and polyamides with an ionic compatibilizer and a cobalt salt to produce a container having both active and passive oxygen barrier and carbon dioxide barrier properties with improved haze as compared to containers known in the art.

DETAILED DESCRIPTION OF THE INVENTION

The present invention relates to compositions comprising polyester, partially aromatic polyamide, ionic compatibilizer, and optionally a cobalt salt as well as modified polyesters for use in these compositions. In one nonlimiting embodiment, the compositions as well as the modified polyesters are useful in production of containers.

Generally polyesters can be prepared by one of two processes, namely: (1) the ester process and (2) the acid process. The ester process is where a dicarboxylic ester (such as dimethyl terephthalate) is reacted with ethylene glycol or other diol in an ester interchange reaction. Because the reaction is reversible, it is generally necessary to remove the alcohol (methanol when dimethyl terephthalate is employed) to completely convert the raw materials into monomers. Certain catalysts are well known for use in the ester interchange reaction. In the past, catalytic activity was then sequestered by introducing a phosphorus compound, for example polyphosphoric acid, at the end of the ester interchange reaction. Primarily the ester interchange catalyst was sequestered to prevent yellowness from occurring in the polymer.

Then the monomer undergoes polycondensation and the catalyst employed in this reaction is generally an antimony, germanium or titanium compound, or a mixture of these.

In the second method for making polyester, an acid (such as terephthalic acid) is reacted with a diol (such as ethylene glycol) by a direct esterification reaction producing monomer and water. This reaction is also reversible like the ester process and thus to drive the reaction to completion one must remove the water. The direct esterification step does not require a catalyst. The monomer then undergoes polycondensation to form polyester just as in the ester process, and the catalyst and conditions employed are generally the same as those for the ester process.

For most container applications this melt phase polyester is further polymerized to a higher molecular weight by a solid state polymerization.

In summary, in the ester process there are two steps, namely: (1) an ester interchange, and (2) polycondensation. In the acid process there are also two steps, namely: (1) direct esterification, and (2) polycondensation.

Suitable polyesters are produced from the reaction of a diacid or diester component comprising at least 65 mol-% terephthalic acid or C1-C4 dialkylterephthalate, preferably at least 70 mol-%, more preferably at least 75 mol-%, even more preferably, at least 95 mol-%, and a diol component comprising at least 65% mol-% ethylene glycol, preferably at least 70 mol-%, more preferably at least 75 mol-%, even more preferably at least 95 mol-%. It is also preferable that the diacid component is terephthalic acid and the diol component is ethylene glycol, thereby forming polyethylene terephthalate (PET). The mole percent for all the diacid component totals 100 mol-%, and the mole percentage for all the diol component totals 100 mol-%.

Where the polyester components are modified by one or more diol components other than ethylene glycol, suitable diol components of the described polyester may be selected from 1,4-cyclohexandedimethanol, 1,2-propanediol, 1,4-butanediol, 2,2-dimethyl-1,3-propanediol, 2-methyl-1,3-propanediol (2MPDO) 1,6-hexanediol, 1,2-cyclohexanediol, 1,4-cyclohexanediol, 1,2-cyclohexanedimethanol, 1,3-cyclohexanedimethanol, and diols containing one or more oxygen atoms in the chain, e.g., diethylene glycol, triethylene glycol, dipropylene glycol, tripropylene glycol or mixtures of these, and the like. In general, these diols contain 2 to 18, preferably 2 to 8 carbon atoms. Cycloaliphatic diols can be employed in their cis or trans configuration or as mixture of both forms. Preferred modifying diol components are 1,4-cyclohexanedimethanol or diethylene glycol, or a mixture of these.

Where the polyester components are modified by one or more acid components other than terephthalic acid, the suitable acid components (aliphatic, alicyclic, or aromatic dicarboxylic acids) of the linear polyester may be selected, for example, from isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid, bibenzoic acid, 2,5-:furandicarboxylic acid, 2,4-:furandicarboxylic acid, 3,4-:furandicarboxylic acid or mixtures of these and the like. In the polymer preparation, it is often preferable to use a functional acid derivative thereof such as the dimethyl, diethyl, or dipropyl ester of the dicarboxylic acid. The anhydrides or acid halides of these acids also may be employed where practical. These acid modifiers generally retard the crystallization rate compared to terephthalic acid.

Also particularly contemplated by the present invention is a modified polyester made by reacting at least 85 mol-% terephthalate from either terephthalic acid or dimethylterephthalate with any of the above comonomers.

In addition to polyester made from terephthalic acid (or dimethyl terephthalate) and ethylene glycol, or a modified polyester as stated above, the present invention also includes the use of 100% of an aromatic diacid such as 2,6-naphthalene dicarboxylic acid or bibenzoic acid, or their diesters, and a modified polyester made by reacting at least 85 mol-% of the dicarboxylate from these aromatic diacids/diesters with any of the above comonomers. In a preferred embodiment, the polyester is PET modified with an agent which reduces crystallization rate of the polyester used for the containers. In one nonlimiting embodiment, the agent is isophthalic acid (IPA). In one nonlimiting embodiment, IPA ranges from 0.5 to 10 wt. %, more preferably 1 to 6 wt. %, more preferably 2 to 5 wt. %, and more preferably 2.5 to 4.5 wt. %.

In one nonlimiting embodiment, the polyamide used as the gas barrier component of the blend is selected from the group of partially aromatic polyamides is which the repeating unit of the polyamide contains at least one aromatic ring and a non-aromatic species. Nonlimiting examples of partially aromatic polyamides include: poly(m-xylylene adipamide); poly(m-xylylene adipamide-co-isophthalamide); poly(hexamethylene isophthalamide); poly(hexamethylene adipamide-co-isophthalamide); poly(hexamethylene adipamide-co-terephthalamide); poly(hexamethylene isophthalamide-co-terephthalamide); or mixtures of two or more of these. In a preferred embodiment, the polyamide is poly(m-xylylene adipamide-co-isophthalamide). More preferred is a polyamide MXD6 modified with a comonomer. Most preferred for increasing burst pressure is the polyamide MXD6 of a low molecular weight grade and modified with a comonomer such as is commercially available from EMS Grivory. In one nonlimiting embodiment, the polyamide used is EMS Grivory HB, 7187 low molecular weight grade.

In one nonlimiting embodiment, the MXD6 contains aliphatic, cycloaliphatic or aromatic diacids as a co-monomer. In one nonlimiting embodiment, the MXD6 contains isophthalic acid (IPA) as a co-monomer.

The preferred range of polyamide is 1 to 10% by weight of the composition depending on the required gas barrier required for the container. In one embodiment, the polyamide is about 2 to 8% by weight of the composition. In one embodiment, the polyamide is about 3 to 6% by weight of the composition. In one embodiment, the polyamide is about 5% by weight of the composition.

The ionic compatibilizer is preferably a copolyester containing a metal sulfonate salt group. The metal ion of the sulfonate salt may be Na+, Li+, K+, Zn++, Mn++, Ca++ and the like. The sulfonate salt group is attached to an aromatic acid nucleus such as a benzene, naphthalene, diphenyl, oxydiphenyl, sulfonyldiphenyl, or methylenediphenyl nucleus.

Preferably, the aromatic acid nucleus is sulfophthalic acid, sulfoterephthalic acid, sulfoisophthalic acid, 4-sulfonaphthalene-2,7-dicarboxylic acid, and their esters. Most preferably, the sulfomonomer is 5-sodiurnsulfoisophthalic acid, 5-lithiumsulfoisophthalic acid or 5-zincsulfoisophthalic acid and most preferably their dialkyl esters such as the dimethyl ester (SIM) and glycol ester (SIPEG). The preferred range of 5-sodiumsulfoisophthalic, 5-lithiumsulfoisophthalic acid or 5-zincsulfoisophthalic acid to increase burst pressure and/or reduce the haze of the container is 0.1 to 2.0 wt. %, more preferably 0.1 to 1 wt. %, more preferably 0.4 to 0.7 wt. %, more preferably 0.45 wt. %. A commercially available ionic compatibilizer useful in the present invention is NaSIM (5-sodiumsulfoisophthalic acid dimethyl ester).

In a preferred embodiment, the polyester is PET modified to include the ionic compatibilizer. More preferred is that the PET be modified to comprise both IPA and the ionic compatibilizer. More preferred is that modified PET for use in the compositions of the present invention comprise both IPA and NaSIM. More preferred is that the modified PET comprise 2.5-4.5 wt. % IPA and 0.4 to 0.7 wt. % NaSIM. A nonlimiting example of modified PET for use in the present invention is F044 resin, a PET modified with 2.95 wt. % IPA and 0.45 wt. % NaSIM.

In a preferred embodiment, the composition contains more than 50% polyester with an ionic compatibilizer, more preferred more than 70% polyester with ionic compatibilizer and most preferred more than 90% polyester with ionic compatibilizer. Accordingly, containers prepared from these compositions with more than 50% polyester may be referred to as polyester containers.

Suitable cobalt compounds for optional use with the present invention include cobalt acetate, cobalt carbonate, cobalt chloride, cobalt hydroxide, cobalt naphthenate, cobalt oleate, cobalt linoleate, cobalt octoate, cobalt stearate, cobalt nitrate, cobalt phosphate, cobalt sulfate, cobalt (ethylene glycolate), and mixtures of two or more of these, among others. As a transition metal catalyst for active oxygen scavenging, a salt of a long chain fatty acid is preferred, cobalt octoate or stearate being the most preferred. For color control of passive gas barrier blends any cobalt compound can be used, with cobalt acetate being preferred.

It has surprisingly been found that a composition of the present invention comprising a modified PET resin with 2.95 wt. % IPA and 0.45 wt. % NaSIM and 5 wt. % poly(m-xylylene adipamide-co-isophthalamide) of a low molecular weight grade such as EMS Grivory HB, 7187 low molecular weight grade, produced containers with higher burst pressure than containers made from previous blends. In one nonlimiting embodiment, the containers of the present invention exhibit a burst pressure greater than 8 bar, more preferably greater than 8.5 bar, more preferably greater than 9 bar and most preferably 9.4 bar.

In addition, at a lower intrinsic viscosity, a similar burst pressure to those of previous blends can be achieved with this composition of the present invention, thus providing economical advantages over previous blends.

Further, the compositions and containers produced from the compositions of the present invention exhibited modified crystallization. In particular, by modified crystallization as used herein, it is meant that an overall shift in the crystallization process inclusive of, but not limited to, a higher crystallization temperature and/or delayed onset of crystallization during, for example, but not limited to, one or more stages of heating involved in container production, is observed as compared to containers made with previous blends. This modified crystallization is useful in expanding the production window.

Containers produced from a composition of the present invention comprising a modified PET resin with 2.95 wt. % IPA and 0.45 wt. % NaSIM and 5 wt. % poly(m-xylylene adipamide-co-isophthalamide) of a low molecular weight grade such as EMS Grivory HB, 7187 low molecular weight grade also exhibited improved haze as compared to containers produced from previous blends such as PolyShield® 2300K resin and 5 wt. % MXD6 (Mitsubishi 6007 grade). For example, 0.5 L bottles of the present invention exhibited a bottle haze of less than 7%. Haze determination of keg portions also revealed a substantial haze reduction as compared to kegs of previous blends such as PolyShield® 2300K resin and 5 wt. % MXD6 (Mitsubishi 6007 grade).

Accordingly, in one nonlimiting embodiment, the composition of the present invention consists essentially of a modified PET resin with 2.5-4.5 wt. % IPA and 0.4 to 0.7 wt. % NaSIM and 2-8 wt. % poly(m-xylylene adipamide-co-isophthalamide) of a low molecular weight grade such as EMS Grivory HB, 7187 low molecular weight grade.

Although not required, additives may be used in the compositions of the present invention. Conventional known additives include, but are not limited to dyes, pigments, solid carrier for dyes or pigments, liquid carrier for dyes or pigments, fillers, branching agents, reheat agents, anti-blocking agents, antioxidants, anti-static agents, biocides, blowing agents, coupling agents, flame retardants, heat stabilizers, impact modifiers, UV and visible light stabilizers, crystallization aids, lubricants, plasticizers, processing aids, acetaldehydes and other scavengers, and slip agents, as well as combinations and mixtures thereof.

Accordingly, in one nonlimiting embodiment, the composition of the present invention consists essentially of a modified PET resin with 2.5-4.5 wt. % IPA and 0.4 to 0.7 wt. % NaSIM and 2-8 wt. % poly(m-xylylene adipamide-co-isophthalamide) of a low molecular weight grade such as EMS Grivory HB, 7187 low molecular weight grade and one or more additives selected from dyes, pigments, solid carrier for dyes or pigments, liquid carrier for dyes or pigments, fillers, branching agents, reheat agents, anti-blocking agents, antioxidants, anti-static agents, biocides, blowing agents, coupling agents, flame retardants, heat stabilizers, impact modifiers, UV and visible light stabilizers, crystallization aids, lubricants, plasticizers, processing aids, acetaldehydes and other scavengers, and slip agents, as well as combinations and mixtures thereof.

The blend of polyester, ionic compatibilizer, cobalt salt and partially aromatic polyamide is conveniently prepared by adding the components at the throat of the injection molding machine that produces a preform that can be stretch blow molded into the shape of the container. If a conventional polyester base resin designed for polyester containers is used, then one method is to prepare a master batch of a polyester containing the ionic compatibilizer, and optionally a transition metal catalyst for active scavenging, together with the partially aromatic polyamide using a gravimetric feeder for the three components. Alternatively the polyester resin can be polymerized with the ionic compatibilizer, and optionally a transition metal catalyst for active scavenging, to form a copolymer. This copolymer can be mixed at the injection molding machine with the partially aromatic nylon. Alternatively all the blend components can be blended together, or as a blend of master batches, and fed as a single material to the extruder. The mixing section of the extruder should be of a design to produce a homogeneous blend.

These process steps work well for forming carbonated soft drink, water, wine or beer bottles, and containers for hot fill applications, and in particular large containers for carbonated beverages wherein a burst pressure of 8 or greater is required. The present invention can be employed in any of the conventional known processes for producing a polyester container.

Certain combinations of base polyester resin, such as PET based resins, containing commercial additive packages can be injection molded into containers displaying better clarity and low haze. The molding cylinder temperature during injection molding can be an independent variable to improve haze for such resin compositions. The molding cylinder temperatures can be in the range from about 260° C. to about 285° C. This temperature range may be desirable to reliably produce low-haze PET containers having good gas barrier properties. Commercial additive packages for use during injection molding may include, but not limited to, alkali metals, alkaline earth metals, transition metals, poor metals and/or their salts such as carbonates, acetates, stearates, non-metal compounds such as halides, silicone, phosphorus, semi-aromatic polyamides, and others.

Compositions of the present invention can also be incorporated into multilayer films or containers in accordance with procedures well known to those skilled in the art such as described, for example, in EP 1832625 and EP 1339796.

Testing Procedures

Number Average Molecular Weight

The number average molecular weight of different JvlXD6 grades can be determined chromatographically A typical set up is as follows:

About 25 mg of the MXD6 sample is dissolved in 5.0 ml HFIP (hexafluoro 2-propanol) for about 2-3 hrs at room temperature. Then DMT (dimethyl terephthalate) as internal standard is added to the MXD6 solution and the solution is filtered.

The following equipment is used for the analysis:
HPLC-pump PIOO; company Thermo Finnigan
Column thermostat "Mistral"; company Spark (temperature: 25° C.)
RI detector 2300 from company Knauer
Software: WinGPC 6.0; company PSS
Columns: SDV-GellO)™; 10³ A, 10⁵ A, 10⁶ A
Flow: 0.50 ml/min
Eluent: hexafluoro-2-propanol with 0.1 M K-trifluoro acetate
Injection volume: 20.0).!1

The determination of the molecular weights was done via calibration with PMMA standards (3 PMMA-Ready Cal-Kit from the company PSS Polymer Standard Service Mainz, Germany. Each kit contains 3 different PMMA standards for calibration).

The determination of the number average molecular weight was done based on the PMMA calibration. Molecular weights greater 1500 g/mol are determined.

Intrinsic Viscosity

The determination of the intrinsic viscosity was determined on a 0.01 g/mL polymer solution in dichloroacetic acid.

Before dissolution of solid state polymerized polyester material, the chips were pressed in a hydraulic press (pressure: 400 leN at 115° C. for about 1 minute; type: PW40® Weber, Remshalden-Grunbach, Germany). 480 to 500 mg polymer, either amorphous chips or pressed chips, were weighed on an analytical balance (Mettler AT 400®) and dichloroacetic acid is added (via Dosimat® 665 or 776 from Metrohm) in such an amount, that a final polymer concentration of 0.0100 g/mL was reached.

The polymer was dissolved under agitation (magnetic stirring bar, thermostat with set point of 65° C.; Variomag Thermomodul40ST®) at 55° C. (internal temperature) for 2.0 hrs. After complete dissolution of the polymer, the solution is cooled down in an aluminum block for 10 to 15 minutes to 20° C. (thermostat with set point of 15° C.; Variomag Thermomodul 40ST®).

The viscosity measurement was performed with the micro Ubbelohde viscometer from Schott (type 53820/II; capillary diameter: 0.70 mm) in the SchottAVS 500® apparatus. The bath temperature is held at 25.00±0.05° C. (Schott Thermostat CK 101®). First the micro Ubbelohde viscometer is purged 4 times with pure dichloroacetic acid then the pure dichloroacetic acid is equilibrated for 2 minutes. The flow time of the pure solvent is measured 3 times. The solvent is drawn off and the viscometer is purged with the polymer solution 4 times. Before measurement, the polymer solution is equilibrated for 2 minutes and then the flow time of this solution is measured 3 times.

The relative viscosity (RV) is determined by dividing the flow time of the solution by the flow time of the pure solvent. RV is converted to IV using the equation: IV (dl/g)=[(RV−1)×0.691]+0.063.

Oxygen Ingress Measurements-Non-Invasive Oxygen Determination (NIOD)

There are several methods available to determine the oxygen permeation, or transmission, into sealed packages such as bottles. In this case, non-invasive oxygen measurement systems (e.g., supplied by OxySense® and PreSens Precision Sensing) based on a fluorescence quenching method for sealed packages were employed. They consist of an optical system with an oxygen sensor spot (e.g. OxyDot®, which is a metal organic fluorescent dye immobilized in a gas permeable hydrophobic polymer) and a fiber optic reader-pen assembly which contains both a blue LED and photo-detector to measure the fluorescence lifetime characteristics of the oxygen sensor spot (e.g. OxyDot®).

The oxygen measurement technique is based upon the absorption of light in the blue region of the metal organic fluorescent dye of the oxygen sensor spot (e.g., OxyDot®), and fluorescence within the red region of the spectrum. The presence of oxygen quenches the fluorescent light from the dye as well as reducing its lifetime. These changes in the fluorescence emission intensity and lifetime are related to the oxygen partial pressure, and thus they can be calibrated to determine the corresponding oxygen concentration.

The oxygen level within a package such as a bottle can be measured by attaching an oxygen sensor spot (e.g., OxyDot®) inside the package. The oxygen sensor spot is then illuminated with a pulsed blue light from the LED of the fiber optic reader-pen assembly. The incident blue light is first absorbed by the dot and then a red fluorescence light is emitted. The red light is detected by a photo-detector and the characteristic of the fluorescence lifetime is measured. Different lifetime characteristics indicate different levels of oxygen within the package.

Experimental Method with PET Bottle at Ambient Conditions (23° C.)

A PreSens non-invasive and non-destructive oxygen ingress measurement equipment (Fibox 3-trace meter, fiber optic cable and trace oxygen sensor spots) was used to determine the oxygen permeability of the bottle at room temperature (23° C.). For a typical shelf-life test, the trace oxygen sensor spot was first attached onto the inner side wall of a 500 ml transparent PET bottle. The bottle was then filled with deionized and deoxygenated water containing AgN03 up to a headspace of approx. 20 ml, inside a nitrogen circulation glove box where the oxygen level of the water inside the bottle was stabilized at a level well below 50 ppb. These bottles were then stored in a conditioning cabinet (Binder 23° C., 50% relative humidity) and the oxygen ingresses were monitored as a function of time using the PreSens oxygen ingress measurement equipment.

At a given time of measurements, an average value was first obtained from about 10 readings taken on the output of the trace oxygen spot for each bottle. This was then repeated for all the 5 bottles so as to achieve an overall averaged value for the oxygen ingress through the formulated cap and the wall of the bottle.

Oxygen measurements were made on day 0, 1, 2, 3, 8, 14, 21, 28, 42 and 56, and the average oxygen ingress was determined and reported as ppb.

Haze Measurement

Haze measurements on 0.5 l bottles were determined with a ColorQuest XE instrument from Hunter Associates Laboratory, Inc. Reston, Va. USA. Used software for the calculation: EasyMatch QC, version 4.80. Measurement is done in the TTRAN (total transmission) mode; Area View: 9.525 mm.

A transmission haze measurement is the ratio of the diffuse light to the total light transmitted by the bottle side wall. Haze is calculated as follows:

$$Haze[\%]=(Y_{Diffuse\ transmission})/(Y_{Total\ transmission})\times 100$$

Haze is measured in transmission mode; this mode includes both the light that is transmitted directly through the sample and the light that is diffusely scattered.

The Hunterlab color Quest XE instrument is switched on at least 30 minutes before any measurement. The instrument is standardized in the TTRAN (total transmission) mode, area view 9.525 mm Standardization sets the top and the bottom of the scale for the neutral axis. The bottom of the scale is set with the black card placed at the reflectance port. The top of the scale is then set by scaling the light which is reflected to a white calibrated tile. Finally nothing was placed at the reflectance port for the last step in the standardization of the instrument. During the standardization of the instrument, the transmission compartment door was open.

A measurement without sample was done i.e. no sample is in the transmission compartment of the instrument and during measurement, the transmission compartment door was open. The first measurement was done with the calibrated white tile at the reflectance port. Then the next measurement was done w/o sample and nothing was placed at the reflectance port. The haze of this measurement was 0.0%.

A bottle with known haze was measured before any other bottle is analyzed. For this measurement, the 0.5 L bottle was placed in the transmission compartment. Due to the size of the bottle, the transmission compartment door was open during measurement. The bottle side wall was as close as possible to the sphere. Then the first measurement in TTRAN mode was done with the calibrated white tile at the reflectance port. Then, the bottle being still in the transmission compartment, a second measurement was done with nothing placed at the reflectance port. The determined bottle haze was used to check the performance of the instrument.

The bottle haze was determined for 10 bottles for one specific composition. Each bottle is measured as described for the reference bottle above. The 0.5 L bottle is placed in the transmission compartment. The bottle side wall was a close as possible to the sphere. The first measurement in TTRAN mode was done with the calibrated white tile at the reflection port. Then the bottle is measured again, now with nothing placed at the reflectance port. The determined haze value by the instrument was recorded. Then the remaining 9 bottles were measured in the same was.

The haze values were used to calculate the arithmetic mean of the percent bottle haze for 10 bottles.

The haze for a 20 L keg cannot be measured on the keg due its size. Accordingly for kegs or large containers, haze is determined in cut out pieces from the straight bottle side wall and normalized % haze per 100 flm.

Measurement of Carbon Dioxide Loss of Bottles

The measurement of carbon dioxide loss of bottles was done using a Carbo QC C02 meter from the company Anton Paar. Tests were conducted at 21°±2° C. At least 35 bottles were filled with distilled water containing a C02 level of 5.0±0.3 g C02/L; the used distilled water was microbiologically safe (due to the addition of silver nitrate). The exact C02 level is produced by adding sodium hydrogen carbonate and citric acid. The bottles were closed with standard closures and stored over 6 months at 21°±2° C. At the beginning, the starting C02 level was measured with the Carbo OC C02 meter at 5 bottles. Then after each month, the measurement was repeated on the next 5 bottles.

Isophthalic Acid

The weight percent of isophthalic acid present in the amorphous polymer was determined by Shimadzu GC 2010 AF GC with an FID after polymer hydrolyzation and a silylation reaction. An amorphous polymer sample was saponified with 1.5 m KOH in methanol for at least 1.5 hour. The 1.5 m KOH in methanol contains 1.2 g/L tetraethyleneglycol dimethylether as internal standard. After neutralization with diluted HCl (20%) and mixing 1:5 with pyridine. 50 r-tl of the clear solution is mixed with 300 r-tl pyridine and 400 r-tl BSTFA (N,O-Bis(trimethylsilyl) trifluoro-acetamide). 30 minutes after silylation, the sample is analyzed by GC.

Metal Content

The metal content of the amorphous polymer was determined by X-ray fluorescence measurement with the S4 Explorer from Bruker. 6 g of the amorphous polymer is compressed into a tablet and analyzed. The calibration of the instrument was done via polymers with known levels of elements in the polymer matrix. This method can be used to determine the level of cobalt in the polymer matrix. The concentration of sulfur was used to determine the concentration of the sodium sulfoisopthalic acid in the polymer.

The following examples are given to illustrate the present invention, and it shall be understood that these examples are for the purposes of illustration and are not intended to limit the scope of the invention.

EXAMPLES

Example 1: Batchwise Preparation of the Polyester Copolymer

Batch wise preparation of polyethylene terephthalate copolymer comprises two sub steps:
a) esterification of purified terephthalic acid (PTA) using monoethylene glycol and
b) polycondensation.

Esterification

The esterification is carried out in a separate heated vessel with an added vigreux column under atmospheric pressure under the distillation of water. After esterification, the sodium dimethyl-5-sulfoisophthalate (5-NaSIM) as a solution in mono ethylene glycol is added together with the other additives. The final mixture is then transferred into the polycondensation vessel and the polycondensation is performed. After the polycondensation is finished, the needed amount of cobalt is added via late addition to the polyester melt. Once the polycondensation was completed, the autoclave was cleaned using mono ethylene glycol. The amounts used, the method, and the other conditions are described below and summarized in Table 1.

The esterification of purified terephthalic acid (PTA) and isophthalic acid (IPA) with monoethylene glycol (MEG) consists first in melting a low IV esterification product of PTA with MEG (IV of 0.152 dl/g, CEG of 484 mmol/kg) at a temperature of about 250° C. After melting of the low IV esterification product, the addition of the PTA/IPA/MEG paste in small amounts was started. For copolyesters containing NaSIM as co-monomer, the paste contains additional sodium acetate as buffer. Distillation of water is done under atmospheric conditions. The temperature in the esterifier vessel is kept above 215° C. and the overhead temperature of the MEG/water vapour is kept below 120° C. The dosing of the PTA/MEG paste is done, that the temperature ranges are not exceeded. At the end of the paste addition, the temperature in the esterifier vessel increases continuously, but the temperature of the esterified melt should not increase above 250° C. The esterification is continued until the overhead temperature drops below 90° C.

At the end of the esterification reaction, a NaSIM solution in MEG containing sodium acetate as buffer is added and again the esterified melt is stirred for 10 minutes. After this step, the required amounts of phosphorous (also as a solution in MEG) followed by the addition of the antimony polycondensation catalyst (also as a solution in MEG) were added. After each addition step, the melt is stirred for 10 minutes.

Polycondensation

After the addition of the polycondensation catalyst antimony, the esterified melt is transferred into the polycondensation autoclave. Over a period of about 30 minutes, the temperature of the esterified melt was increased to 280° C. and the pressure was reduced from atmospheric pressure to a vacuum of about 1 mbar. Under these conditions the polycondensation is started and MEG/water vapors are removed and condensed in a cold trap. The extent of reaction is monitored by the increase of torque. After the final torque increase is reached, the vacuum was broken with nitrogen. Under nitrogen flow, the required amount of about 85 ppm (mg/kg) of cobalt is added as cobalt stearate. After the addition of cobalt stearate, the polymer melt was stirred for another 20 minutes to ensure homogeneous distribution of the cobalt in the polymer melt.

The resulting composition comprised PTA-based PET, 2.95 wt. % IPA, 260 ppm Sb (added as Sb2O3), 4.0 ppm P (added as polyphosphorous acid), 3.0 ppm graphite, 200 ppm NaOAc, 4500 ppm of NaSIM, 80 ppm Co (added as Co-Stearate) and exhibited an amorphous IV of 0.62 an SSP to IV of greater 0.81 dllg.

The autoclave was then pressurized with nitrogen to 0.3-0.7 bar and the polymer melt exits the polymerization reactor as a strand. This strand was then cooled below $T_g$ of the polymer in a water bath and pelletized.

Solid State Polymerization

In order to further increase the IV of the polyester, a solid state polymerization followed. Before solid stating, the resins were crystallized starting at 1000 C and rising to 1600 C in 6 hrs then followed by 8 hrs at 160° C. The crystallization and drying is done under vacuum of about 1 mbar. After crystallization the resins were solid stated at 215° C. under vacuum of about 1 mbar (±0.5 mbar) for several hours to reach a final IV of greater 0.81 dl/g.

The components and data for the four batches are shown in Table 1:

TABLE 1

| | Prepared Batches | | | |
|---|---|---|---|---|
| | Batch 1 | Batch 2 | Batch 3 | Batch 4 |
| Low IV esterification product | 630 g | 630 g | 630 g | 630 g |
| Purified Terephthalic acid | 1057 g | 1057 g | 1057 g | 1057 g |
| Isophthalic acid | 54.9 g | 54.9 g | 54.9 g | 54.9 g |
| Monoethylene glycol | 525 g | 525 g | 525 g | 525 g |
| Sodium acetate | 280 mg | 280 mg | 280 mg | 280 mg |
| MEG for NaSIM solution | 30 g | 75.3 g | 108.9 g | 149 g |
| Polyphosphoric acid | 14.7 mg | 14.7 mg | 14.7 mg | 14.7 mg |
| Polycondensation-Catalyst | 330 mg Sbz03 | 330 mg Sbz03 | 330 mg Sbz03 | 330 mg Sbz03 |
| Cobait stearate | 895 mg | 895 mg | 895 mg | 895 mg |
| NaSIM [wt. %] | 0.18 | 0.45 | 0.65 | 0.89 |
| SSP Temperature | 215° C. | 215° C. | 215° C. | 215° C. |
| SSP Duration | 8.5 hrs | 11.5 hrs | 13.25 | 11 hrs |
| IV [ dl/g] | 0.83 | 0.84 | 0.83 | 0.81 |
| SSP Temperature | 215° C. | 215° C. | 215° C. | 215° C. |

Example 2: Preform and Bottle Process

Unless otherwise stated, the NaSIM containing PET copolyester was dried at 160° C. under vacuum (about ≤1 mbar) overnight until a final moisture level below 50 ppm (mg/kg) was reached. The polyamide was dried overnight at 80-100° C. under vacuum (about ≤1 mbar) until a moisture level equal or below 200 ppm was reached. 95 wt. % of the dried NaSIM containing PET copolyester was blended with 5 wt. % of the dried polyamide resin. The chip blend was melted and extruded into preforms. The injection molding machine was purged by about 750 g of each new chip blend material. The first 30 preforms were not used for further processing. After the 30th preform each 3rd preform is collected until 10 preforms are obtained. Each preform for a 0.5 liter soft drink bottle, for example, employed about 28 grams of the resin. The preform was then heated to about 85-120° C. and stretch-blown into a 0.5 liter contour bottle at a planar stretch ratio of approx. 8. The stretch ratio is the stretch in the radial direction times the stretch in the length (axial) direction. Thus, if a preform is blown into a bottle, it may be stretched about two times in the axial direction and stretched up to about four times in the hoop direction giving a planar stretch ratio of up to eight (2×4). Since the bottle size is fixed, different preform sizes can be used for obtaining different stretch ratios. The sidewall thickness of the bottles was >0.25 mm.

As polyamides two polyamides from Mitsubishi were used:

MXD6 6007: Poly(m-xylylene adipamide) with a number average molecular weight of 26,000 g/mol MXD6 6003: Poly(m-xylylene adipamide) with a number average molecular weight of 16,200 g/mol The polyamide EMS Grivory HB (7187 low molecular weight grade) was also used.

Example 3: Burst Pressure for 20 L kegs

Comparative Composition A:

95 wt. % PolyShield® 2300K resin and 5 wt. % MXD6 from Mitsubishi (6007 grade) was injection molded together into a preform weighing 379 grams. The preform was stored overnight at room temperature and stretch-blow molded into 20 Liter kegs. The preform temperature before stretch-blow molding is maintained at about 118° C.

Comparative Composition B:

95 wt. % PolyShield® F044 resin and 5 wt. % MXD6: from Mitsubishi (6003 grade) was injection molded together into a preform weighing 379 grams. The preform was stored overnight at room temperature and stretch-blow molded into 20 Liter kegs. The preform temperature before stretch-blow molding is maintained at about 116° C.

Inventive Composition A:

95 wt. % PolyShield® F044 resin and 5 wt. % MXD6 from EMS Grivory HB (7187 grade) was injection molded together into a perform weighing 379 grams. The preform was stored overnight at room temperature and stretch-blow molded into 20 Liter kegs. The perform temperature before stretch-blow molding is maintained at about 114° C.

Burst Pressure Test:

The burst pressure was done by filling the kegs with water at room temperature. Then the filled keg was closed and through the closing water was pumped into the container to pressurize the container. The pressure was followed and the value recorded when the container burst. The test we repeated 5 times. A burst at the bottom with sharp crusts was regarded as an outlier.

Results: from the burst pressure test as well as Keg IV are shown in Table 2.

TABLE 2

Burst Pressure

| | Keg IV [dl/g] | Average Burst Test [bar] N = 5 kegs |
|---|---|---|
| 2300K + 5% MXD6 6007 | 0.770 | 7.9 |
| F044 + 5% MXD6 6003 | 0.740 | 8.0 |
| F044 + 5% EMS 7187 low mol. Wt. | 0.762 | 9.4 |

As can be seen from these results, a composition comprising F044 resin and low molecular weight MXD6 grade 7187 from EMS Grivory unexpectedly exhibited an increased burst pressure of 9.4 as compared to the 8 bar value of comparative examples. In these experiments, F044 and MXD6 6003 produced containers with burst pressures equivalent to the 2300K and MXD6 6007 grade at lower IV. This indicates that a lower IV for the F044 and the low molecular weight MXD6 grade Grivory HB 7187 from EMS (the composition of the present invention) could be used to produce containers with burst pressures equivalent to those of prior blends at lower keg IV's. The use of lower IV materials can provide economical advantages.

Example 4: Haze Determination

Comparative Composition A:
 95 wt. % PolyShield® 2300K resin and 5 wt. % MXD6 from Mitsubishi (6007 grade) was injection molded together into a perform weighing 28 grams. The preform was stored overnight at room temperature and stretch-blow molded into 0.5 Liter bottles. The perform temperature before stretch-blow molding is maintained at about 103-106° C.

Comparative Composition B:
 95 wt. % PolyShield® 2300K resin and 5 wt. % MXD6 from Mitsubishi (6003 grade) was injection molded together into a preform weighing 28 grams. The preform was stored overnight at room temperature and stretch-blow molded into 0.5 Liter bottle. The perform temperature before stretch-blow molding is maintained at about 103-106° C.

Comparative Composition C:
 95 wt. % PolyShield® 2300K resin and 5 wt. % MXD6 from EMS Grivory HB (7187 grade, low molecular weight) was injection molded together into a perform weighing 28 grams. The preform was stored overnight at room temperature and stretch-blow molded into 0.5 Liter bottles. The perform temperature before stretch-blow molding is maintained at about 103-106° C.

Comparative Composition D:
 95 wt. % PolyShield® F044 resin and 5 wt. % MXD6 from Mitsubishi (6007 grade) was injection molded together into a perform weighing 28 grams. The preform was stored overnight at room temperature and stretch-blow molded into 0.5 Liter bottles. The perform temperature before stretch-blow molding is maintained at about 103-106° C.

Comparative Composition E:
 95 wt. % PolyShield® F044 resin and 5 wt. % MXD6 from Mitsubishi (6003 grade) was injection molded together into a preform weighing 28 grams. The preform was stored overnight at room temperature and stretch-blow molded into 0.5 Liter bottle. The perform temperature before stretch-blow molding is maintained at about 103-106° C.

Inventive Composition A:
 95 wt. % PolyShield® F044 resin and 5 wt. % MXD6 from EMS Grivory HB (7187 grade low molecular weight) was injection molded together into a perform weighing 28 grams. The preform was stored overnight at room temperature and stretch-blow molded into 0.5 Liter bottles. The perform temperature before stretch-blow molding is maintained at about 103-106° C.

Results from haze determination in accordance with the test procedure set forth herein of these 0.5 l bottles is set forth in Table 3.

TABLE 3

Haze Determination

| Production Resins | Bottle Haze [%] | Absolute Haze Reduction [%] | Relative Haze Reduction [%] |
|---|---|---|---|
| 2300K (0.178% NaSIM) + 5% regular grade MXD6 6007 | 11.4 | 0 | 0 |
| 2300K (0.178% NaSIM) + 5 wt. % low molecular weight MXD6 (6003) | 7.7 | 3.7 | 32 |
| 2300K (0.178% NaSIM) + 5 wt. % EMS Grivory HB 7187 low molecular weight | 7'9 | 3.5 | 31 |
| F044 (0.45% NaSIM) + 5 wt. % regular grade MXD6 6007 | 9.1 | 2.3 | 20 |
| F044 (0.45% NaSIM) + 5 wt. % low molecular weight MXD6 6003 | 7'1 | 4.3 | 38 |
| F044 (0.45% NaSIM) + 5 wt. % EMS Grivory HB 7187 low molecular weight | 6.6 | 4.8 | 42 |

A reduction in bottle haze and absolute haze was unexpectedly observed in bottles produced from a composition comprising F044 resin and low molecular weight MXD6 grade 7187 from EMS Grivory as compared to the comparative examples.

Example 5: Shift in Crystallization

Impact on crystallization, inclusive of determination of both peak temperature and onset of crystallization during the first stage of heating from room temperature to 300° C. on the bottle thread was assessed during production of containers. A modification in crystallization, and in particular an overall shift in the crystallization process was unexpectedly observed in bottles produced from a composition comprising F044 resin and low molecular weight MXD6 grade 7187 from EMS Grivory as compared to comparative examples. This shift in crystallization process should increase the window of production for containers using the composition of the present invention.

Although particular embodiments of the invention have been described in detail, it will be understood that the invention is not limited correspondingly in scope, but include all changes and modifications coming within the spirit and terms of the claims appended hereto.

What is claimed is:
1. A composition comprising:
    a polyethylene terephthalate polyester modified to include 2.95 wt. % isophthalic acid, 0.45 wt. % sodium dimethyl-5-sulfoisophthalate (NaSIM),
    poly(meta-xylylene adipamide-co-isophthalamide),
    and a cobalt salt.

2. The composition of claim 1, wherein said poly(meta-xylylene adipamide-co-isophthalamide) is present in a range from about 2 to about 8 wt. % of said composition.

3. The composition of claim 2, wherein said poly(meta-xylylene adipamide-co-isophthalamide) is present in about 5 wt. % of said composition.

4. The composition of claim 1, wherein said cobalt salt is present in a range from about 20 to about 500 ppm of said composition.

5. The composition of claim 1 further comprising one or more additives.

6. The composition of claim 5 wherein the one or more additives is selected from dyes, pigments, solid carrier for dyes or pigments, liquid carrier for dyes or pigments, fillers, branching agents, reheat agents, anti-blocking agents, antioxidants, anti-static agents, biocides, blowing agents, coupling agents, flame retardants, heat stabilizers, impact modifiers, UV and visible light stabilizers, crystallization aids, lubricants, plasticizers, processing aids, acetaldehydes and other scavengers, and slip agents, as well as combinations and mixtures thereof.

7. A process for preparing an article comprising
providing a composition comprising:
a polyethylene terephthalate polyester modified to include 2.95 wt. % isophthalic acid, 0.45 wt. % sodium dimethyl-5-sulfoisophthalate (NaSIM),
poly(meta-xylylene adipamide-co-isophthalamide), and
a cobalt salt.

8. The process according to claim 7, wherein the article is a container or preform.

9. The process according to claim 8 wherein the container exhibits a burst pressure of greater than 8 bar.

* * * * *